UNITED STATES PATENT OFFICE.

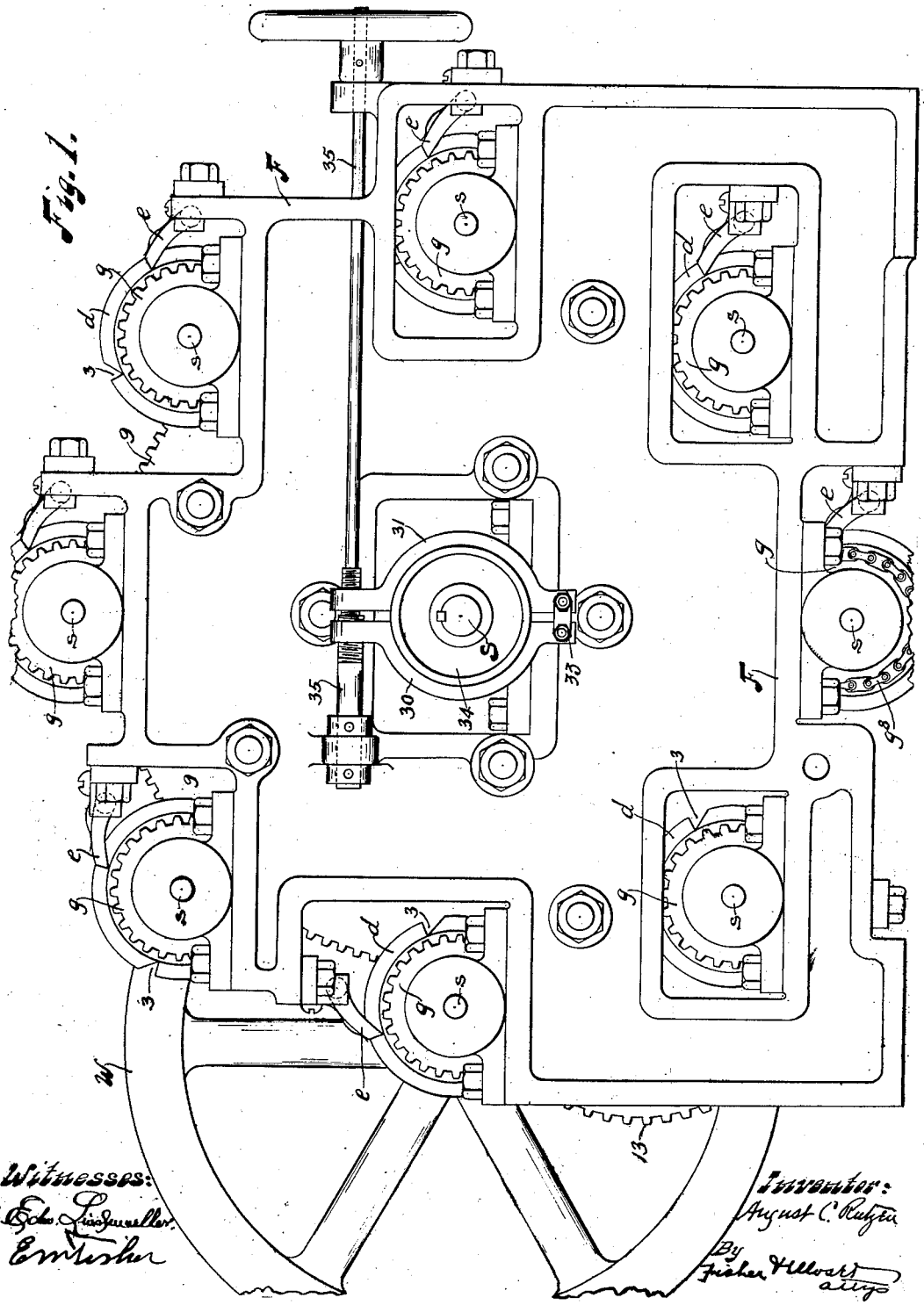

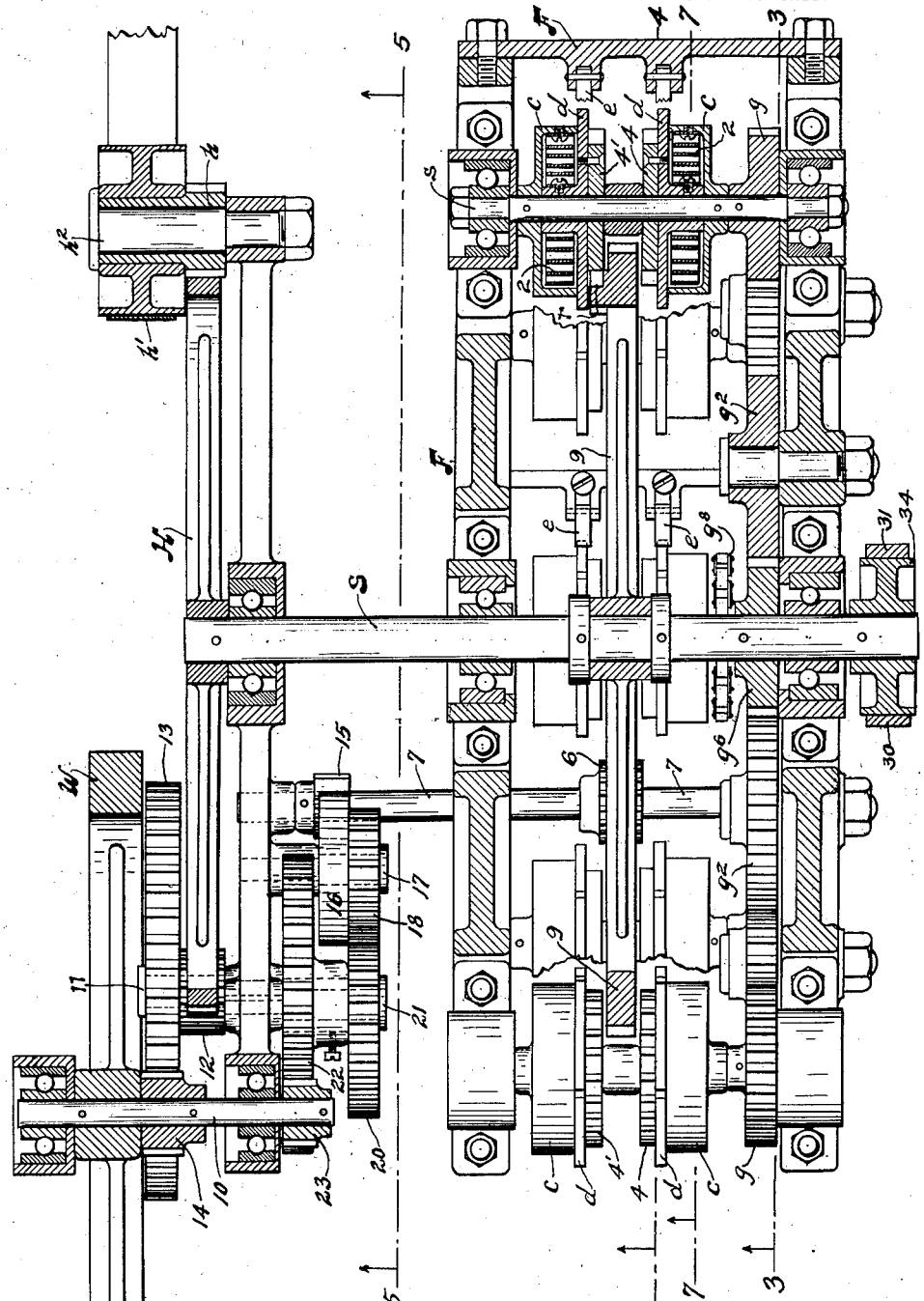

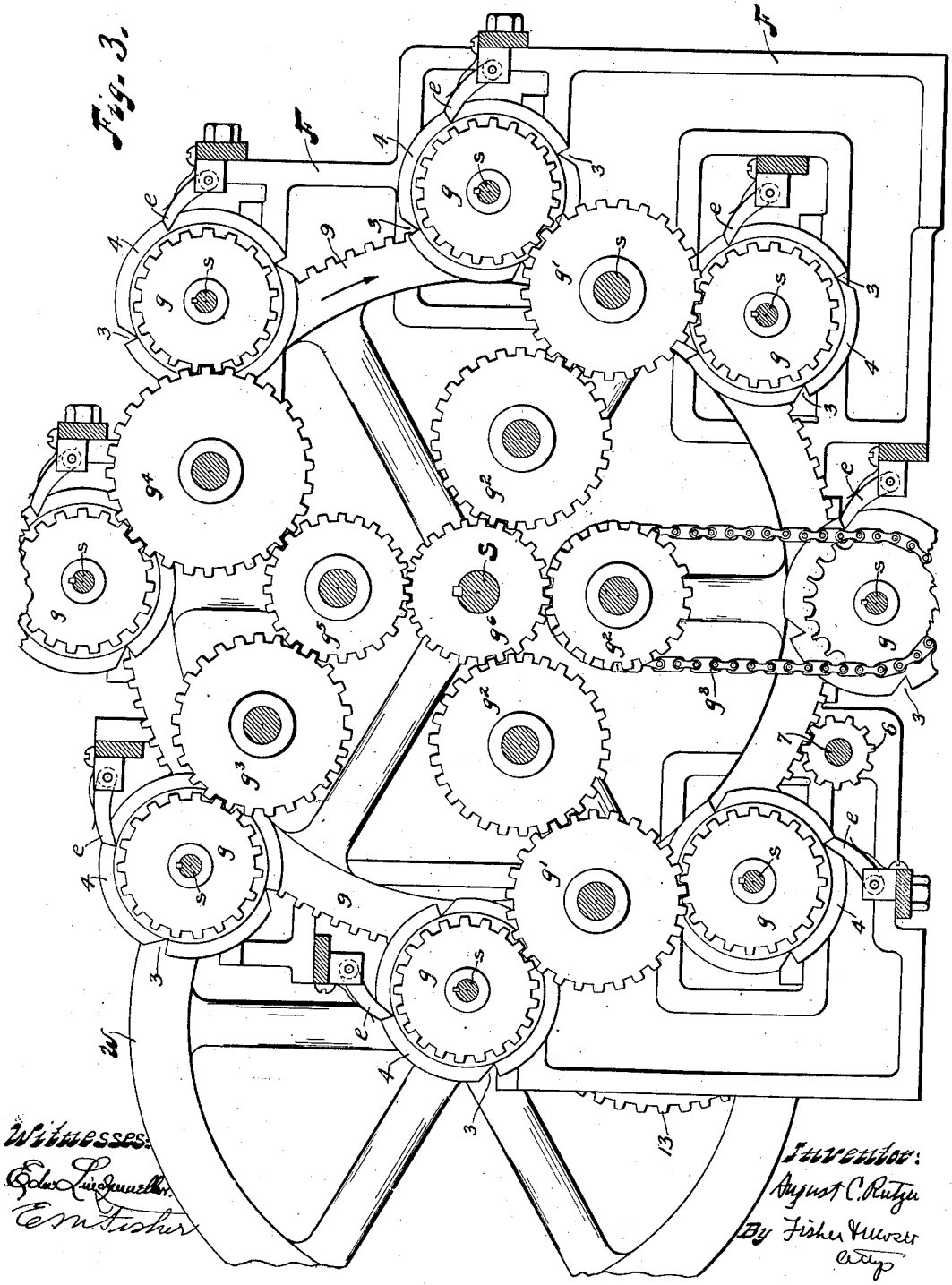

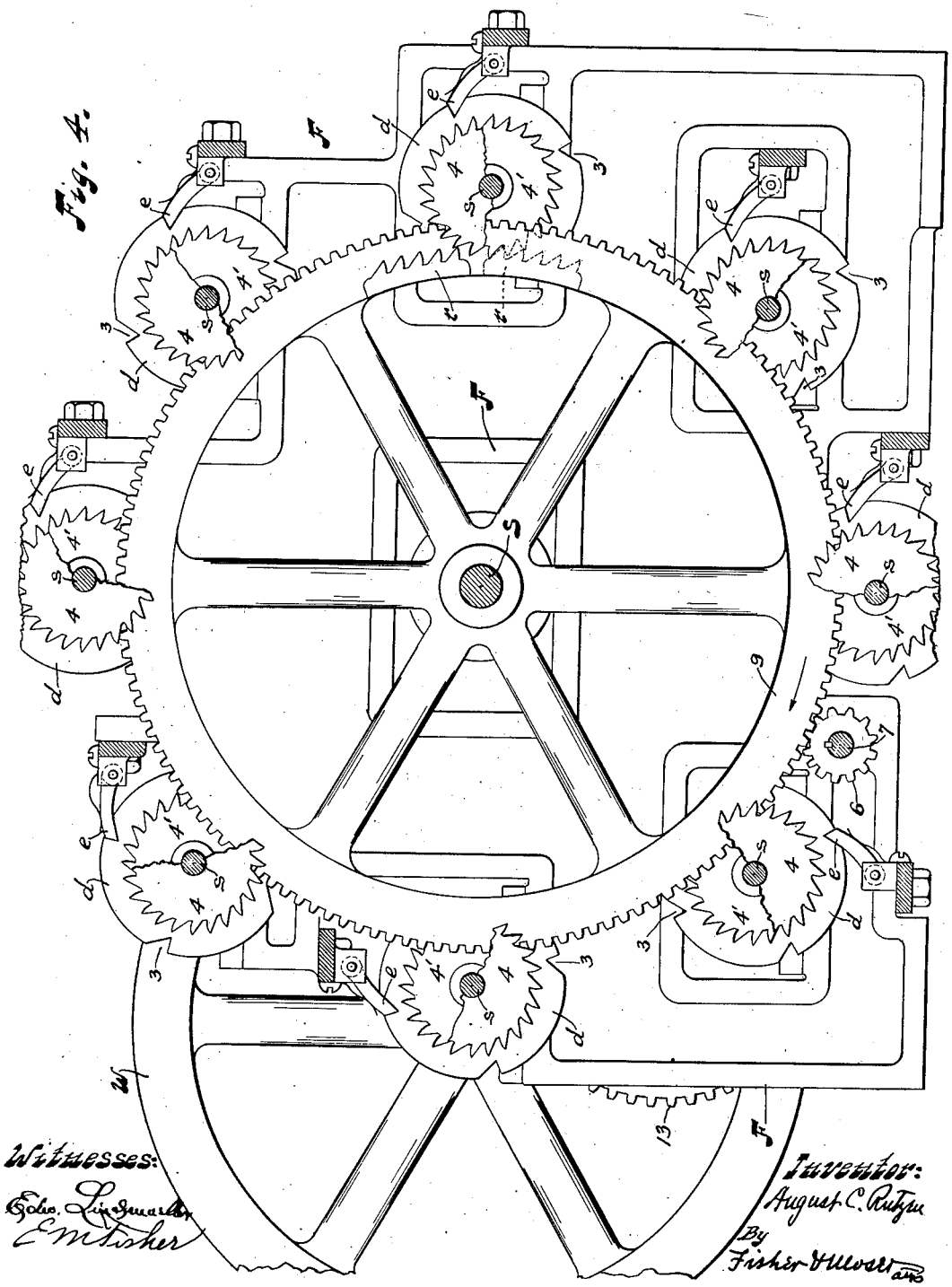

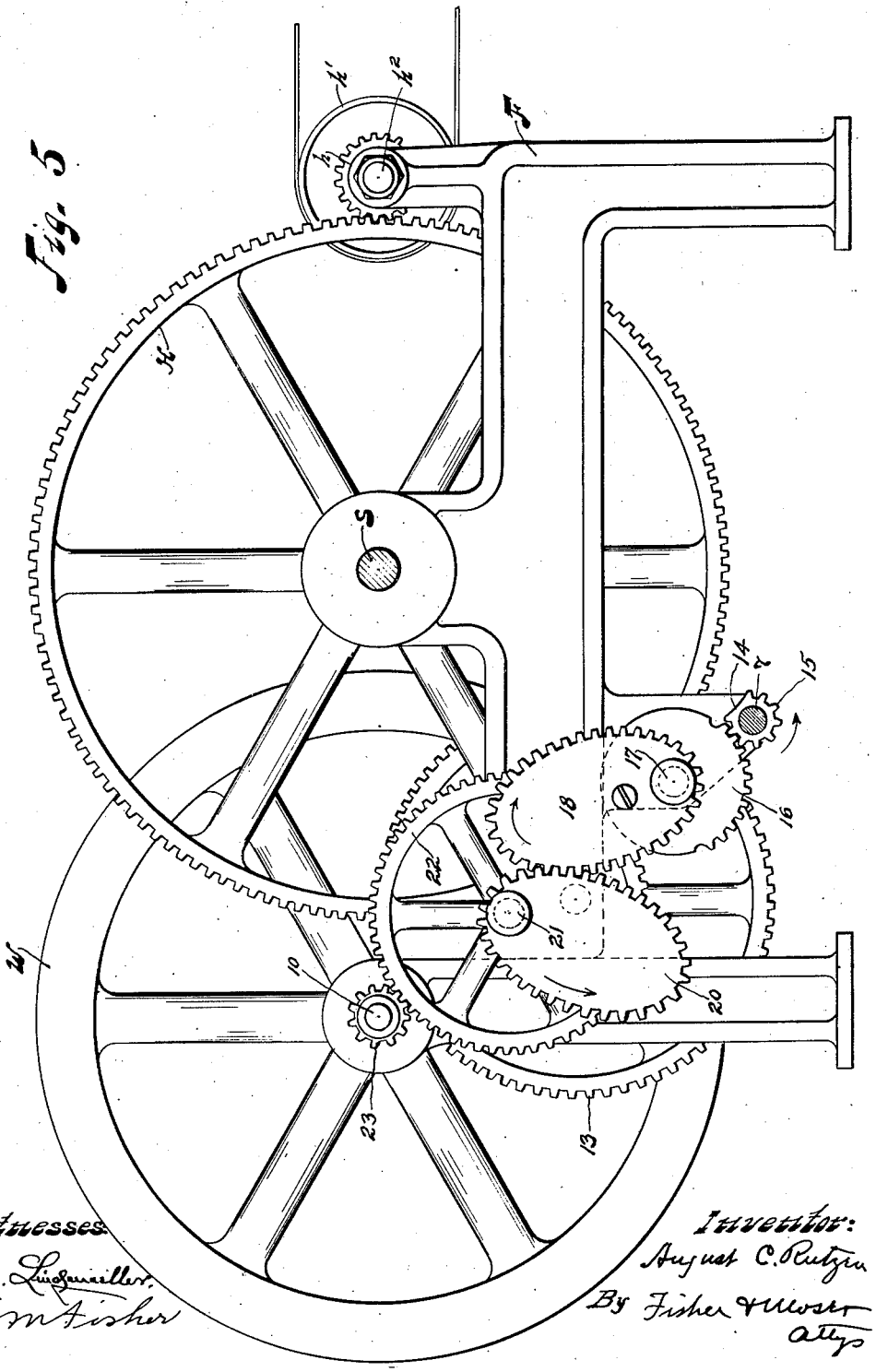

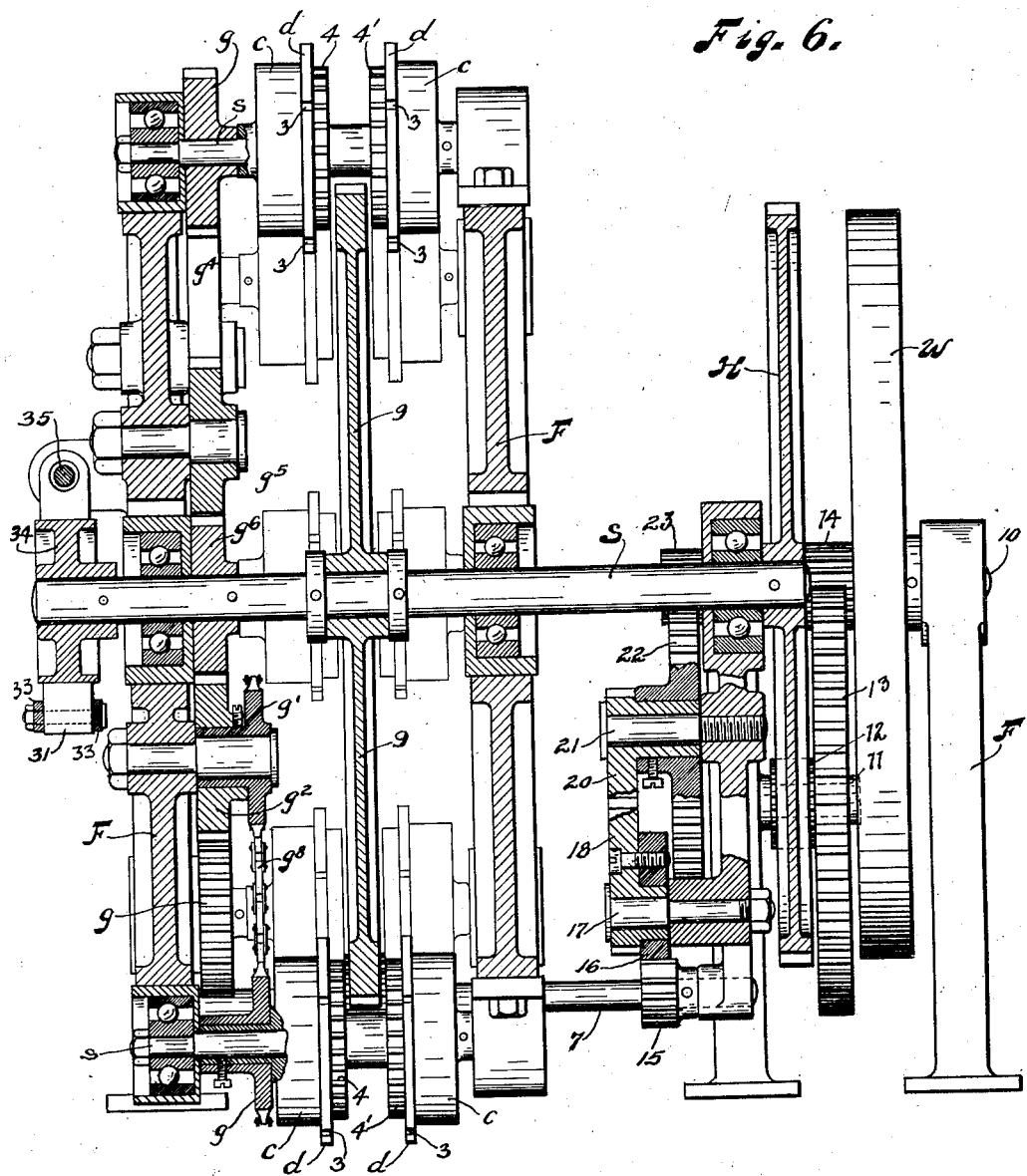

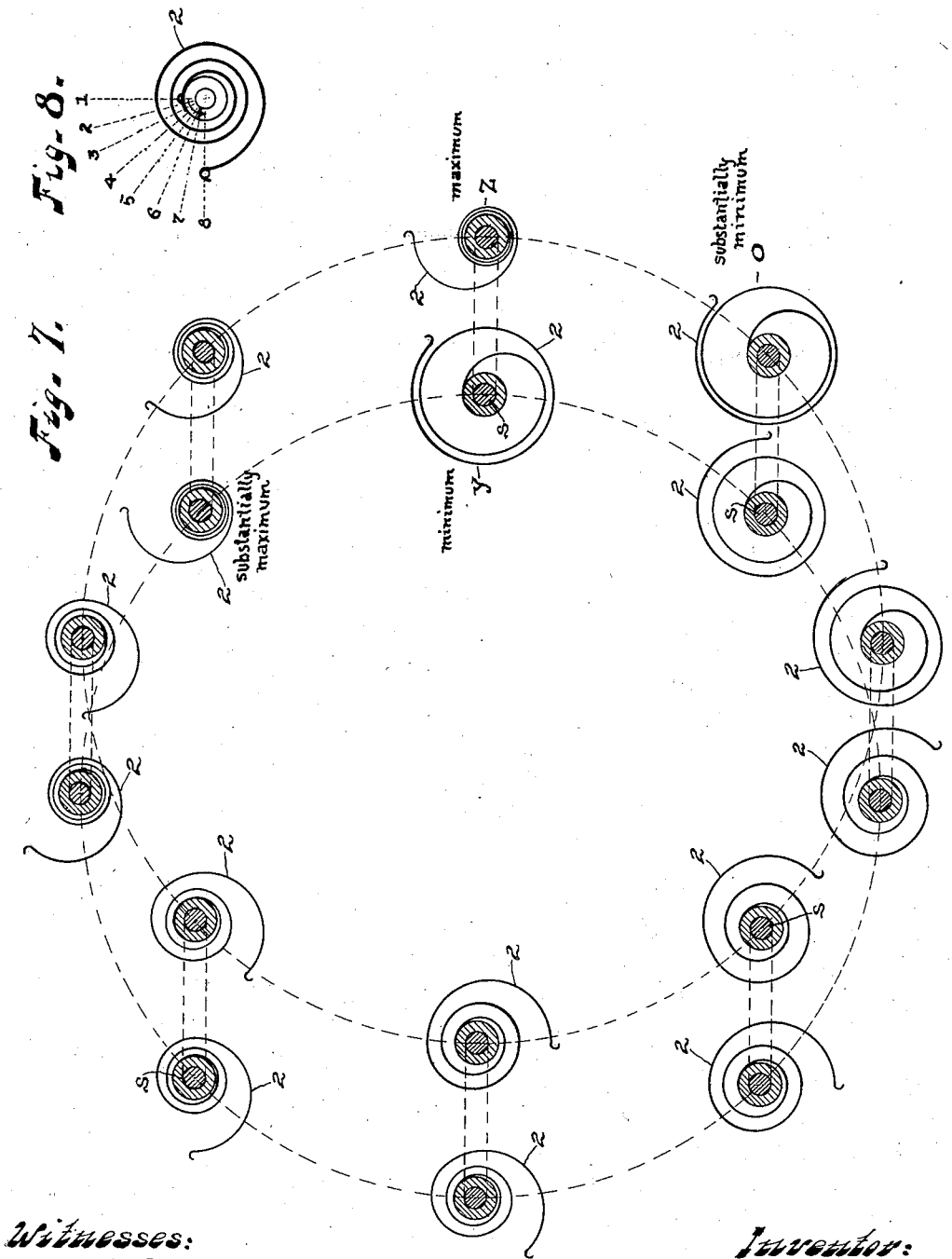

AUGUST C. RUTZEN, OF CLEVELAND, OHIO.

SPRING-POWER MOTOR.

1,178,947.          Specification of Letters Patent.      Patented Apr. 11, 1916.

Application filed January 2, 1914. Serial No. 809,851.

*To all whom it may concern:*

Be it known that I, AUGUST C. RUTZEN, a citizen of the United States, residing at Cleveland, in the county of Cuyahoga and State of Ohio, have invented certain new and useful Improvements in Spring-Power Motors, of which the following is a specification.

This invention consists in a spring-power motor constructed and operating substantially as shown and described and particularly pointed out in the claims.

In the accompanying drawings, Figure 1 is a side elevation of the machine and disclosing the fly-wheel on the opposite side. Fig. 2 is a horizontal sectional plan view on a line corresponding to central axis of Fig. 1. Fig. 3 is a sectional elevation of the machine corresponding substantially to line 3—3, on Fig. 2, looking inward. Fig. 4 is a sectional elevation of the machine on a line corresponding to 4—4, Fig. 2. Fig. 5 is a sectional elevation of the machine on a line corresponding to 4—4, Fig. 2, looking outward and disclosing the rewinding mechanism. Fig. 6 is a central sectional elevation of the machine on a line corresponding substantially to 6—6, Fig. 2, looking to the left or toward the fly-wheel. Fig. 7 is a side elevation more or less diagrammatic corresponding in the main to line 7—7, Fig. 2, but showing only the power springs with those on the same shaft projected laterally to disclose the relative windings of all the springs. Fig. 8 is a diagrammatic view showing one of the helical springs in full lines and eight radiating dotted lines to represent the relative tension of eight of such springs in the cycle as actually used in one of my machines.

F is the main frame upon which all the operating parts are mounted, and a skeleton structure is preferable and may be cast in a single piece or built up in as many separate pieces as shall seem desirable. A main shaft S, to which all the power from the springs is delivered, is located at the center of the said frame in anti-friction bearings, preferably, and all the spring actuated shafts $s$ and the springs 2 thereon are disposed in planetary order about the said central or solar shaft S in a circle at equal distances therefrom and from each other and in suitable bearings in the main frame.

The power springs 2 are arranged on the shafts $s$ in pairs, in this instance, but the machine can be run with a single spring on each shaft though not as satisfactorily as with two or more. Of course the volume of power obtained in any size of machine will depend on the number and size of the springs, and hence the machine may be said to have infinite possibilities since the number of springs on each shaft may be multiplied and the size increased without any present known limitations. The said springs are helical in form and encircle the shafts $s$ in suitable housings or casings $c$, mounted rigidly upon the said shafts. The outer end of each spring is secured to the outer wall of its casing and the inner end to the hub of a winding disk $d$ free on its shaft, the said hub extending within said casing and having the inner end of the spring affixed thereto, the said disk lying close against the otherwise open side of said casing. The said disk also is provided with four several notches or teeth 3 on its periphery spaced quarter distances apart and adapted to be engaged by spring pressed pawls $e$ supported on the main frame and preventing unwinding of the springs. A greater number of notches or teeth may be used, if desired. Power is transmitted from the said springs through said shafts $s$ to the main shaft S by intermediate mechanism of several kinds, as shown herein, but not necessarily different. In fact a single kind of transmitting parts for all machines of a given size is manifestly better for both economy of manufacture and convenience in use, as must be obvious, and in any event all such mechanisms of whatever kind or character must work harmoniously together and provide for identically the same speed of rotation in each and all the driving shafts $s$, also for obvious reasons and particularly on account of the rewinding mechanism common to all. Therefore, in the present illustration, each of the several shafts $s$ has a gear $g$ fixed on one end thereof which transmits through gears $g'$ and $g^2$ as seen in the lower side portions of Fig. 3, or the equivalent of these in the upper side portions of the same figure where transmission is through the gears $g^3$, $g^4$ and $g^5$ to the gear $g^6$ on shaft S. Or I can employ a sprocket chain connection $g^8$ and get the same result as in either of the other two, that is, the delivery of the power from the springs to shaft S. The foregoing idle gears differ in sizes here and there but hold to the same rate of rotation in shafts $s$ and hence uniformity in the unwinding of the springs.

Each shaft $s$ is also provided with a single ratchet or toothed wheel 4 or 4' for each spring and which is fixed by screws or otherwise to the side of the disk $d$ and adapted to be engaged by the winding-up gear wheel 9, loosely mounted on shaft S. The said toothed or ratchet wheels 4 and 4' preferably have teeth of saw tooth shape as shown, adapted to be operatively engaged by the series of teeth $r$ on the said wheel 9 as seen in Figs. 2 and 4. Two such series of teeth $r$ are employed, one on each side of said wheel back of its periphery and so disposed in respect to each other that the first series will leave the corresponding ratchet gear 4' after winding the spring operatively connected therewith before the other series on the other side will come into engagement with the other or opposite gear 4 and wind the second spring on that shaft. The rotation of the parts affected by each series of teeth $r$ is equal to a quarter turn of the disk $d$, or from one notch or tooth 3 therein to the next succeeding one, the pawl $e$ holding what has been taken up in each separate quarter rotation. If additional springs are employed on a shaft they will of course be provided with additional winding mechanism of the kind just described, and all the shafts S and $s$ proportionately lengthened. The said toothed winding wheel 9 is loose on shaft S, as described, and is driven intermittently through pinion 6 on transverse shaft 7 and operating connections with said shaft extending back to the fly wheel shaft 10. The said shaft 10 and wheel $w$ are located on the opposite side of the machine from the driving gear connections for shafts $s$ and S, and power is delivered from shaft S through the master wheel H fixed thereon, the pinion $h$ and pulley $h'$ on stud $h^2$, as seen in Fig. 2. The said wheel H also delivers power to the fly-wheel through a pinion 12 mounted on short shaft 11 and gear wheel 13 on the same shaft and operatively engaging pinion 14 on fly wheel shaft 10. The distribution of energy through these mechanisms is proportionately less than for use at pulley $h'$.

The rewinding mechanism begins with the fly-wheel shaft 10 and is practically independent of the power line issuing in the pulley $h'$. The said mechanism comprises the pinion 6 and wheel 9 and the parts 4 and $d$ hereinbefore described as well as the shaft 7 which carries the said pinion 6 and has its bearings in the opposite sides of the machine. A pinion 15 is mounted on the opposite end of said shaft from the pinion 6 and is meshed by a mutilated gear 16 on a stud 17 supported in the main frame. The said pinion 15 also is notched or blanked in approximately one-fourth of its periphery and adapted to be locked by gear 16 as said notch engages the blank edge of said gear and at predetermined intervals as will presently be seen. Power is transmitted to the said winding wheel 9 through the gears 15 and 16 and the elliptical gear 18, rigid with gear 16, and another and similar elliptical gear 20 mounted on a stud 21 and in constant mesh with the gear 18. The latter gear, 20, is rigid with a gear 22 mounted on the same stud and engaged by pinion 23 on the extremity of fly wheel shaft 10. Intermittent rotation is imparted to the spring-winding wheel 9 through this line of mechanism from the constantly-rotating high-speed fly wheel, and the construction and arrangement of the ellipses 18 and 20 is such that the rewinding is effected by the least possible expenditure of energy. Thus, in Fig. 5, the two gears 18 and 20 are illustrated in substantially the relation they occupy when re-winding has about been accomplished, and they are in effective re-winding position when the lowest point in gear 20 at its axis 21 runs on the highest point of gear 18. At this juncture one of the series of teeth $r$ on the winding wheel 9 contacts with one of the ratchet gears 4 or 4' and winds the corresponding spring on the shaft then exposed. Such action or movement is about completed when the parts are related as seen in Figs. 4 and 5. In such position the blank 14 on pinion 15 will come in contact with the blank on gear 16 and the said parts will be locked, temporarily. Meantime rotation of the several gears 16, 18 and 20 continues at varying speeds and the next re-winding occurs when the teeth on gear 16 come around into engagement with pinion 15. This occurs after the two gears 18 and 20 have made a complete revolution and are back again with the low point of gear 20 directly upon the high point of gear 18. As this occurs the second spring on the shaft $s$ will be wound and the advance teeth of the first sector $r$ will be carried far enough around to sustain approximate engaging relations with the exposed ratchet wheel 4' on the next succeeding shaft $s$, and so on around the circle in endless and repeated operations. It is to be especially observed that the momentum of the high speeded fly wheel is mainly relied upon to do the re-winding rather than power taken directly from the springs.

It will also be understood that, to begin with, all the springs are wound by hand or power devices to the desired tension for each, and that thereafter the re-winding is automatic and successive from spring to spring on the same shaft and from shaft to shaft in continuous round while the machine is running. My plan contemplates the initial winding of the springs to different tensions as more or less arbitrarily shown in Figs. 7 and 8 and the winding may therefore be described as running from zero in the primary or starting spring o in the dotted line orbit of that series to the last or final spring z therein, but spring y on the same shaft as spring z is shown as having substantially the same winding as spring o as it corresponds to o in the other series or orbit.

I have described a quarter turn of the rewinding disks d as sufficient for practical purposes, but it should be understood that I can provide the same with continuous teeth all around and I can also extend each series of teeth r on the rewinding wheel 9 to such number that a complete revolution can be given to said disk instead of a quarter rotation as at present. This of course means that the unwinding of the springs in action will be equal to at least a single convolution of each spring as otherwise they would be liable to be wound too tightly.

The fly-wheel may travel at a rate of say eighteen hundred revolutions per minute, but the speed is geared down to the rewinding wheel 9 so that not exceeding about forty revolutions of the fly-wheel are required to effect a rewinding of a given spring as shown. Hence this action is exceedingly brief and not such as to really affect the speed of the fly wheel. It also occurs that the re-winding mechanism is idle or at rest at predetermined intervals, so that the fly wheel can recuperate whatever slight momentum it might have lost in the last rewinding operation. The said rest period occurs while the said gear 16 is passing its blank portion over the notch in pinion 15.

Respecting the ellipses 18 and 20 it is to be observed that in addition to the advantageous leverage they afford to convey the re-winding force to the springs, giving a maximum of applied energy for a minimum expended, they insure an easy rolling engagement after each period of rest, and there is no jar or shock when the re-winding wheel 9 is brought into repeated actions.

A brake mechanism is provided whereby the machine can be checked or stopped, as shown in Figs. 1, 2 and 4. The said mechanism is of the nature of a two-part clamp adapted to be gradually applied so as not to be too abrupt or sudden in action and thereby probably strip the power gears, as has been my experience. The said brake therefore consists of two parts or sections 30 and 31 pivotally connected by links 33, while the body of said parts is formed to a half circle in each and adapted to engage upon the periphery of a sheave or wheel 34 splined on the outer end of shaft S. The extremities of said parts are approximately near together and engaged by a differential and reversely threaded tightening screw shaft or rod 35, adapted by rotation to the right to tighten said parts on the said wheel and by turning to the left to release them. A comparatively slow and entirely safe braking of the machine is possible by these means, and the machine will automatically resume operation when the brake is released.

It will be seen by reference to Fig. 5, particularly, that the variable speed of rotation imparted through the ellipses 18 and 20 to gears 15 and 16 which rotate the winding wheel 9 are so arranged that the maximum of power is delivered from the fly-wheel at the minimum speed of rotation in the member 18 which carries gear 16 as a fixed member, the object being, of course, to do the winding at the least possible expense of power and thereby least disturb the steady forward movement of the machine. In this connection it may also be noted that I might employ an escapement mechanism to maintain balances or uniform speed at the power or pulley side under all conditions of operation but do not really need it if the fly wheel be of the right size and weight and which of course varies according to the size of the machine. If the said wheel be suitably balanced, say in an electric lighting installation having a dynamo coupled up therewith, there will be no perceptible flicker or waiver of the lights. The converse of the operation above described follows at the time the winding wheel is standing still and the ellipse 20 is crossing the pivot end of ellipse 18.

Fig. 7 magnifies to the eye the differences of winding in the double series of springs, but in my present operative machine, each helical spring 2 is relatively heavy and powerful and is only wound a quarter of a turn to obtain the maximum tension desired, and this quarter winding of the spring occurs initially at the extreme inner end of the coil as indicated in Fig. 8 wherein the spring is shown in full lines as uncoiled and under little or no tension. Winding of the spring to its maximum tension is represented by the dotted radial line 8 and the relative tension of each spring in a cycle of eight is represented by the eight radial lines numbered from 1 to 8. This relative tension of the springs is substantially constant as the mechanism described winds each spring successively from minimum (1) to maximum (8) in a cycle of rotation of the winding gear wheel 9.

Respecting the operation of the machine herein described, it should be understood that I do not claim that the machine will run perpetually, nor do I mean to fix any length of time that it will run, because much will depend on the kind and amount of work that is put upon it. However, I do claim that the machine will do useful work for a longer or shorter period, subject to conditions, and that by the kind of springs and their disposition in the machine and the rewinding mechanism substantially as described, the duration of operation is materially prolonged over what would be possible with the same springs without such rewinding mechanism.

What I claim is:

1. A spring power motor comprising a series of parallel drive shafts and a driven shaft operatively connected with said series of shafts through independent means to each, a plurality of springs on each of said drive shafts, and a line of mechanism adapted to wind up said shafts successively comprising a fly wheel from which the winding proceeds.

2. A spring power motor comprising a power driven shaft and a series of drive shafts operatively connected therewith and having springs to turn the same, a fly wheel actuated from said power driven shaft and means actuated by said wheel to rewind the said springs successively.

3. A spring power motor having a series of parallel shafts and springs thereon and a central shaft driven thereby, a fly-wheel driven by said central shaft and a line of winding mechanism for said springs actuated by said wheel and comprising a single wheel adapted to wind one spring at a time.

4. A spring driven motor and means to wind up the springs therein comprising a fly-wheel and devices having initial drive connection with the axis of said wheel and adapted to operate intermittently in the winding of the springs.

5. A motor comprising a central shaft and a series of radially disposed driving springs about the same, a fly-wheel operated from said shaft and means to wind said springs comprising an intermittent mechanism actuated by said fly-wheel.

6. A spring power motor having a driven shaft and a series of radially disposed drive shafts in parallel relation therewith, transmitting means between said drive shafts and said driven shaft, springs mounted on said drive shafts and a fly-wheel and means therewith adapted to work intermittently and wind one of said springs at a time.

7. A spring power motor having a series of spring driven shafts and winding mechanism for the springs comprising a fly-wheel and an intermittently actuated gear and means therewith to wind the said series of springs successively.

8. A spring power motor having a series of drive shafts arranged in a circle and a plurality of springs on each shaft, and a wheel adapted to travel from shaft to shaft and to wind the springs on the same shaft successively before passing to the next shaft.

9. A spring power motor having a winding mechanism for the springs comprising a centrally disposed winding wheel and means to actuate said wheel at fixed intervals comprising a mutilated gear and pinion and a driving mechanism for said gear adapted to deliver the maximum of power when said gear engages said pinion and the minimum when said parts are out of mesh.

10. A spring power motor having a spring winding mechanism adapted to engage a single spring at a time and means to act intermittently thereon comprising elliptical driving gears and mutilated gears actuated by said elliptical gears.

11. A spring driven motor having winding means comprising a fly-wheel and a spring winding wheel constructed to wind a single spring at a time and means to rotate said wheel at predetermined intervals having mutilated gears and elliptical gears to actuate the same in power connection with said fly wheel.

12. A spring motor having a spring winding mechanism consisting of a winding wheel and means therewith to wind the springs successively and drive mechanism for said wheel comprising a fly-wheel and means actuated thereby and constructed to impart an intermittent rotation to said winding wheel.

13. A spring power motor comprising a series of radially disposed drive shafts and springs thereon and a central driven shaft, in combination with winding mechanism for said springs comprising a fly-wheel and a spring winding wheel geared back to said fly-wheel by means adapted to impart an intermittent rotation to said winding wheel.

14. In spring driven motors, a rewinding mechanism for the springs comprising means at each spring to engage the same and a winding wheel constructed to engage said means, in combination with a fly-wheel and devices adapted to convert the constant rotation of said fly-wheel into an intermittent rotation of said winding wheel.

15. In a spring motor, a series of parallel shafts arranged in a circle and a plurality of springs side by side on each shaft, in combination with means to wind the said springs comprising a toothed wheel for each spring and a winding wheel having teeth oppositely at its sides arranged to engage successively with said toothed wheels on each shaft.

16. A spring motor comprising a central driven shaft and a series of power springs radially disposed about the same and in driving relations therewith and means for automatically rewinding said springs, the said means being constructed and adapted to rewind while the spring itself continues in active driving relations.

17. A spring motor having a central driven shaft and a series of drive shafts about the same and in power connection therewith, a series of power springs on said drive shafts and provided each with rewinding mechanism and means adapted to wind said springs successively, the said springs being in positive driving connection with the said drive shafts through their outer ends and adapted to be wound from their inner ends, whereby said springs are kept in transmitting relations when rewinding occurs.

18. A spring motor having a series of power springs situated in a circle and drive shafts on which said springs are mounted, a power shaft and power transmitting means operatively connecting said drive shafts with said power shaft, and means adapted to wind the said springs successively while the shaft carrying the same is imparting power and the springs are active.

19. A spring motor comprising a series of parallel drive shafts and power springs thereon, a driven shaft having operating connections with the said drive shafts, rewinding mechanisms for said drive shafts and a wheel adapted to rotate and engage said mechanisms successively, the said rewinding mechanism being so constructed as to permit the spring that is being rewound to be active while rewinding occurs.

20. A spring motor machine having a driven shaft and parallel drive shafts about the same and in driving relations therewith, power springs on said drive shafts and means to wind said springs while the springs are active comprising mechanism having a fly wheel and a central gear wheel adapted to cease rotation at predetermined intervals, and to wind said springs successively.

21. A spring power motor comprising a series of drive shafts having springs thereon and means to wind said springs including special winding means at each spring and a wheel adapted to rotate and to stop at predetermined intervals and to wind one spring at a time, the said springs being fixed to rotate said drive shafts during the rewinding operation.

22. In spring driven motors, a series of parallel circularly disposed drive shafts having each a plurality of springs thereon and means to wind all said springs successively from shaft to shaft, said means comprising a wheel adapted to wind two springs on the same shaft before rotating to the next succeeding shaft and provided with ratchet teeth on opposite sides and a ratchet mechanism associated with each spring adapted to be engaged by said teeth.

23. A spring motor having a series of power springs and shafts carrying the same, in combination with means to wind said springs comprising a housing for each spring, a ratchet disk having a hub to which the inner end of the spring is attached, a toothed wheel fixed to the side of said ratchet disk and a power driven gear wheel provided with teeth at its side adapted to engage said ratchet disks and teeth on its periphery to engage said toothed wheels.

In testimony whereof I affix my signature in presence of two witnesses.

AUGUST C. RUTZEN.

Witnesses:
R. B. MOSER,
E. M. FISHER.